Figure 1:
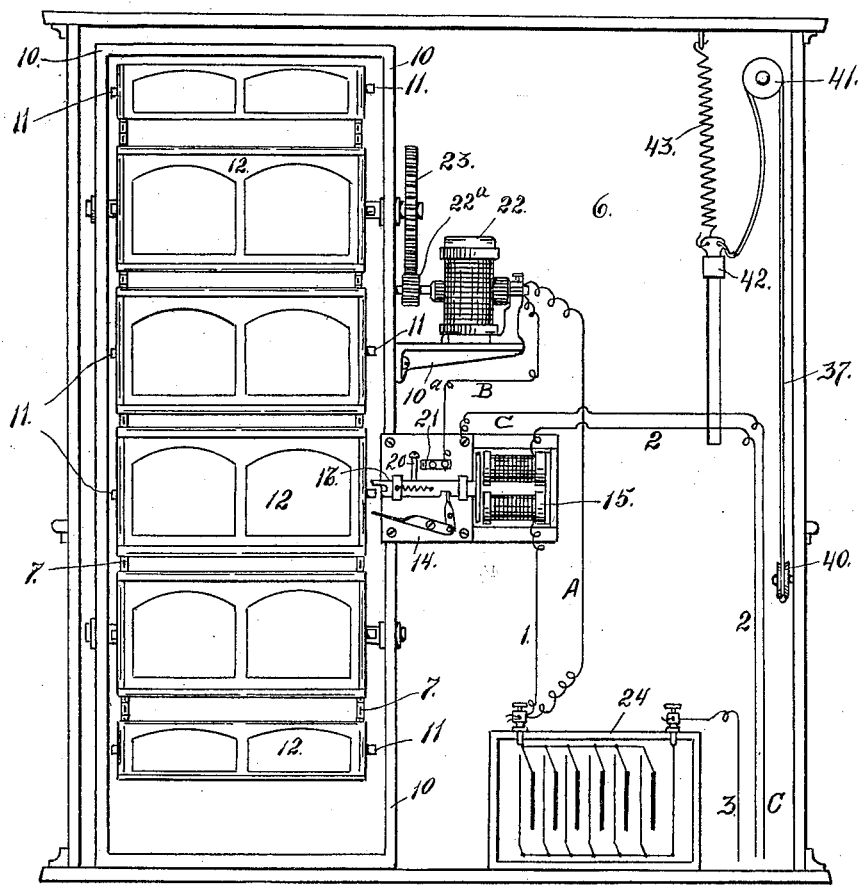
Figure 1:
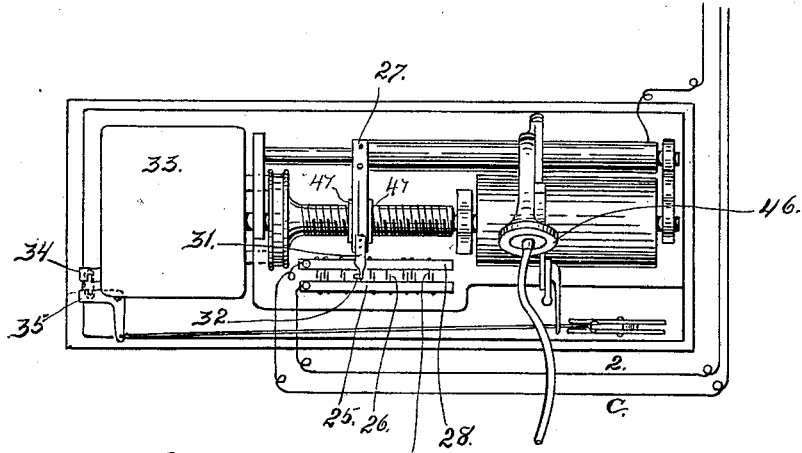

No. 698,369. Patented Apr. 22, 1902.
T. F. BURGESS.
COMBINED PICTURE EXHIBITOR AND PHONOGRAPH.
(Application filed Dec. 12, 1901.)

(No Model.) 4 Sheets—Sheet 1.

WITNESSES: INVENTOR.
Thomas F. Burgess.
BY
ATTORNEY.

THE NORRIS PETERS CO., PHOTO-LITHO., WASHINGTON, D. C.

No. 698,369. Patented Apr. 22, 1902.
T. F. BURGESS.
COMBINED PICTURE EXHIBITOR AND PHONOGRAPH.
(Application filed Dec. 12, 1901.)

(No Model.) 4 Sheets—Sheet 2.

WITNESSES:
INVENTOR.
Thomas F. Burgess.
BY
ATTORNEY.

No. 698,369. Patented Apr. 22, 1902.
T. F. BURGESS.
COMBINED PICTURE EXHIBITOR AND PHONOGRAPH.
(Application filed Dec. 12, 1901.)
(No Model.) 4 Sheets—Sheet 3.
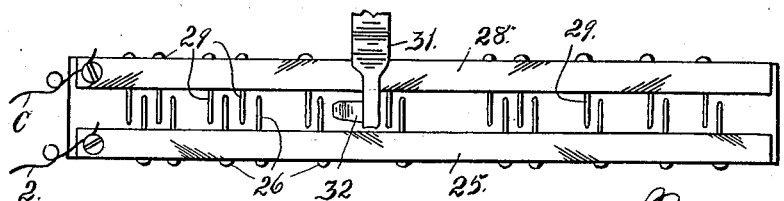
Fig. 3
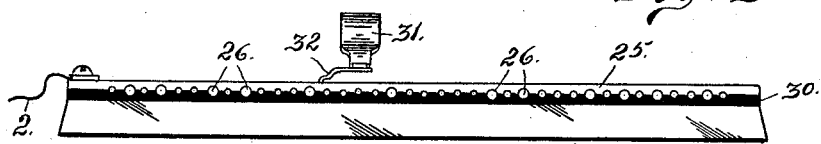
Fig. 4.
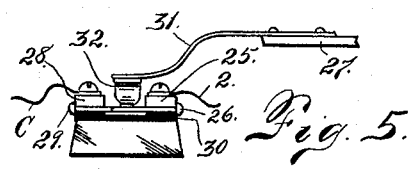
Fig. 5.
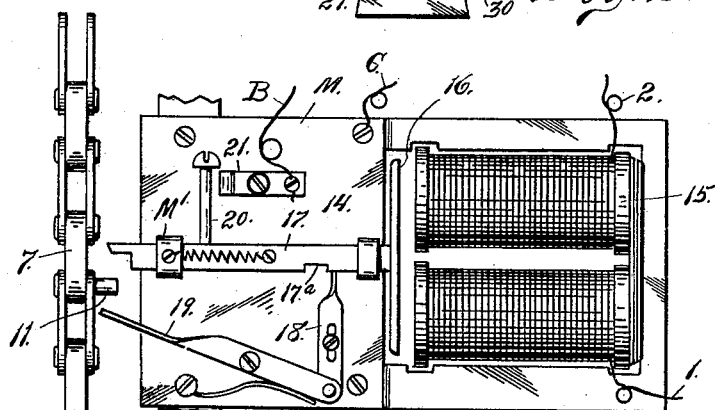
Fig. 6
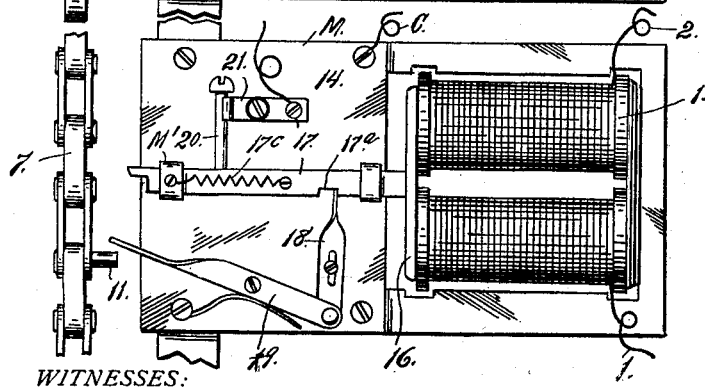
Fig. 7.
WITNESSES:
Otto E. Hoddick.
Dena Nelson.
INVENTOR.
Thomas F. Burgess.
BY
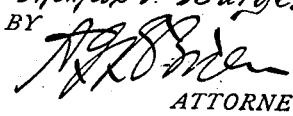
ATTORNEY.
THE NORRIS PETERS CO., PHOTO-LITHO., WASHINGTON, D. C.

No. 698,369. Patented Apr. 22, 1902.
T. F. BURGESS.
COMBINED PICTURE EXHIBITOR AND PHONOGRAPH.
(Application filed Dec. 12, 1901.)

(No Model.) 4 Sheets—Sheet 4.

WITNESSES: INVENTOR.
Otto E. Hoddick. Thomas F. Burgess.
Dena Nelson. BY
ATTORNEY.

UNITED STATES PATENT OFFICE.

THOMAS F. BURGESS, OF DENVER, COLORADO.

COMBINED PICTURE-EXHIBITOR AND PHONOGRAPH.

SPECIFICATION forming part of Letters Patent No. 698,369, dated April 22, 1902.

Application filed December 12, 1901. Serial No. 85,556. (No model.)

*To all whom it may concern:*

Be it known that I, THOMAS F. BURGESS, a citizen of the United States of America, residing at Denver, in the county of Arapahoe and State of Colorado, have invented certain new and useful Improvements in a Combined Picture-Exhibitor and Phonograph; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a combined phonograph and illustrating device, and more particularly to an arrangement for successively displaying a series of pictures illustrating the subject-matter of a phonograph-record as it is being repeated or transmitted to the listener. In view of the double function performed as aforesaid I entitle my improvement a "combined picture-exhibitor and phonograph."

My object is to produce a device for the above purposes, in which any series of pictures illustrating a song or other phonograph-record may readily be placed in position, the display of each successive picture being brought about by the movement of the phonograph, insuring a positive harmony of the illustration with the subject-matter of the record transmitted. To this end it includes the mounting of a series of pictures in their desired sequence on a carrier of suitable construction, the pictures being arranged to travel in successive display in a path focused with reference to the stereoscopic eyeglasses or lenses suitably mounted for the purpose, the carrier being automatically actuated from a moving part of the phonograph.

The scope of the invention also embraces generically a picture-displaying mechanism so arranged with reference to a phonograph or similar instrument that the views illustrative of the repeated or transmitted record shall be successively presented to the listener at proper predetermined intervals.

The invention further consists of the details of construction and combinations of operative parts, all of which I will now proceed to definitely describe, after which I will point out in the claims that which I believe to be novel.

Figure 2:
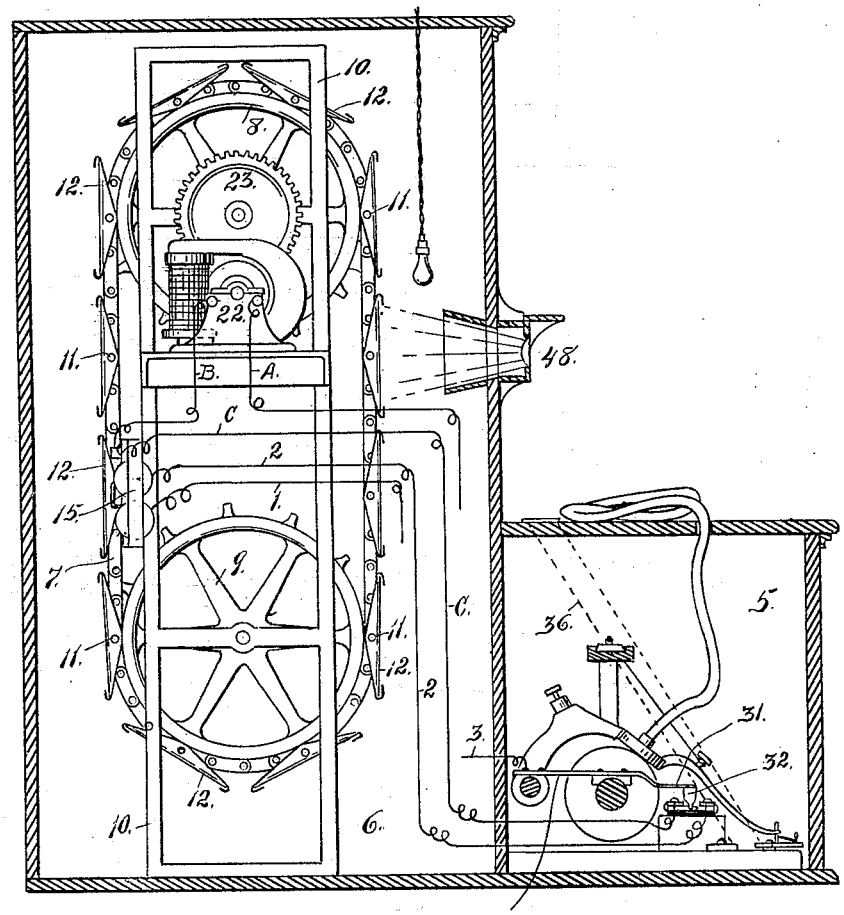
Figure 9:
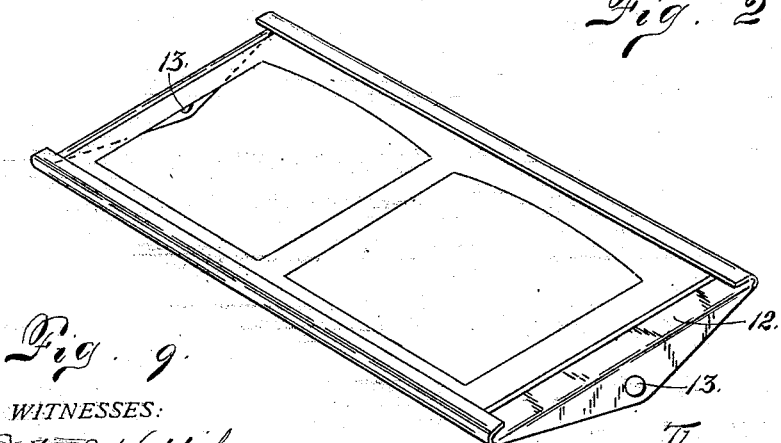
Figure 8:
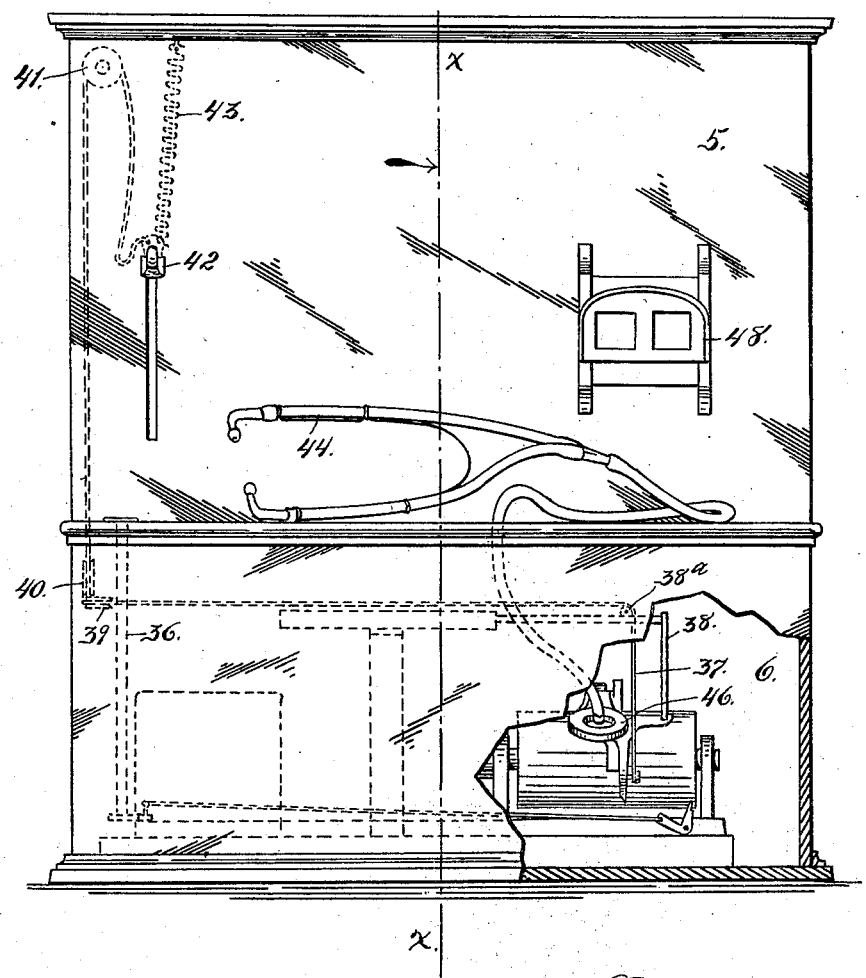

In the drawings, Figure 1 is a rear elevation of my improved device with the back wall of the cabinet removed to show the general arrangement of the picture-carrying belt or reel and its connections. In this view the phonograph is placed below its normal position (see Fig. 2) in order to illustrate the electrical conductors and circuits to better advantage. Fig. 2 is a cross-section of the same, taken on the line *x x* of Fig. 8 and viewed in the direction of the arrow. Figs. 3, 4, and 5 show a top or plan view, a side elevation, and an end view, respectively, and on a larger scale than in Fig. 1, of the means employed for adjustably mounting the electrodes or contacts which alternately operate to close the magnet and motor circuits, as will be hereinafter described. Figs. 6 and 7 are enlarged detail views showing two positions of the electromagnet employed and the devices used in connection therewith. Fig. 8 is a front elevation of the device with a portion broken away to show the manner of operation. Fig. 9 is a detail perspective view of one of the picture-carrying frames or plates, shown on a larger scale.

The same reference characters indicate the same parts in all the views.

By referring to the drawings it will be seen that the apparatus is mounted in a cabinet having two compartments 5 and 6. The phonograph, graphophone, or other similar instrument employed is placed in the compartment 5, while the picture reel or carrier, with its operating mechanism, is mounted in the compartment 6. This reel or carrier consists of two endless chains 7 7, which connect the sprocket-wheels 8 and 9, (there being two of each,) mounted on the frame 10. Spanning the chains 7 and mounted on projecting pins 11 of said chains are the picture-carrying frames or holders 12, a detail view of one of which is shown in Fig. 9. These frames are preferably made of thin sheet metal, having their ends bent downwardly and provided with orifices 13 for engagement with the pins 11, their longitudinal edges being turned upwardly and downwardly, forming ways to receive and retain the pictures placed in the frames or holders. A series of these frames 12 are mounted upon the endless chains an equal distance apart, as seen in Fig. 2. Any desired construction of frame or holder may of course be employed, or, if desired, the pictures may be mounted directly on the chains of the reel or carrier.

To prevent the accidental travel and limit the desired movement of the picture-carrying reel, a stop mechanism 14, operated by a magnet, is employed, detail views of which in two positions are shown in Figs. 6 and 7. The magnet is designated 15 and its armature 16. Secured to the magnet-armature is a reciprocating arm 17, which passes through a guide M', secured to the base-plate M of the magnet. This arm 17 projects beyond the frame 10 and into the path of the projecting pins 11 of the adjacent endless chains 7, thus preventing the travel of the chains when the armature is in the position shown in Fig. 6; but as the magnet becomes energized and the armature 16, with its arm 17, is thrown to the position shown in Fig. 7 the arm 17 is held in this position against the action of a spring $17^c$ by a spring-pressed locking-arm 18, which engages a notch $17^a$ in the arm 17 and is pivoted to a trip-lever 19. This trip-lever is fulcrumed on the base-plate of the magnet and also projects beyond the frame 10, while its free end extends into the path of the traveling pins 11. As the armature 16, with its arm 17, is held in the position shown in Fig. 7, a post or pin 20, secured to the arm 17, is brought into electrical contact with the plate 21, insulated from the base-plate M of the magnet. The engagement of the pin 20 with the contact 21 closes a normally open circuit employed and energizes a motor 22, as will be hereinafter more fully described. This motor is mounted on a bracket $10^a$, secured to the frame 10. Its armatured spindle is provided with a fast pinion $22^a$, meshing with a gear 23, fast on the axle of the upper sprocket-wheels 8, as shown in Figs. 1 and 2.

As far as described it will be seen that the magnet 16, with its coöperating mechanism, is employed to hold the picture-carrying reel stationary at certain periods, while the motor 22 is employed to cause the reel or carrier to travel at certain predetermined intervals. As shown in the drawings, these elements—the magnet and the motor—are electrically connected by separate circuits with the battery 24 or other electrical source employed in operating the mechanism. To more plainly describe the manner of alternately making and breaking these circuits, I have shown in connection with Fig. 1 a top plan view of a phonograph electrically connected with the battery, the magnet, and the motor according to my invention, in which the magnet-circuit is formed through the wire 1, leading from the battery to the magnet, and thence through the wire 2 to the insulated strip 25, which is intermittently connected, through adjustable electrodes or contacts 26, to a traveling arm 27 of the phonograph-carriage, from whence the circuit is completed through the wire 3, connecting the body of the phonograph with the battery. The motor-operating circuit is closed through the wire A, leading from the battery to the motor, from whence the current passes through the wire B to the insulated contact plate or part 21, and when the pin 20 is in contact with the part 21 the current passes on by way of the arm 17 to the base-plate M and the wire C to the insulated strip 28, whence it passes intermittently through the adjustable electrodes 29 to the traveling arm 27 of the phonograph-carriage and returns to the battery through the wire 3, the same as in the circuit first described. The adjustable electrodes 26 and 29 are secured in position, as shown in detail in Figs. 3, 4, and 5, in which the metallic contact-strips 25 and 28 are mounted on a base 30, insulated from the metallic parts of the phonograph, a series of small holes being formed between said strips and the insulated base for the reception of the electrodes or contact-pins 26 and 29, which are removable at will. As shown in Fig. 1, the strips 25 and 28, mounted on the insulated base, are placed parallel with the screw-shaft of the phonograph, and the arm 27, which is carried by the twin nuts of the phonograph, is provided with a projecting arm 31, having a brush end 32, which is caused to travel over the electrodes 26 and 29, making electrical connection with each successive electrode as it passes over it. The devices operated by the screw engaging the twin nuts 47 are collectively termed the "carriage" in this specification.

While the illustrating feature of my invention is automatically operated by the phonograph, the initial operation of the phonograph is regulated by a coin-controlled mechanism, which is arranged as follows: I have herein shown my invention as connected to the well-known electrically-operated Edison phonograph, in which I have concealed the motor by the casing 33. Projecting from this casing 33 are two arms 34 and 35, which form the broken ends of the phonograph-circuit, and to operate the motor a coin is dropped through the slot 36 (see Fig. 8) and is caused to rest over the arms 34 and 35, suitably separated, but arranged to close the circuit of the phonograph-motor when the space between them is bridged by a coin. A flexible connection 37 is secured near the lower end of the transmitter of the phonograph and passing over a sliding frame 38, sheaves 39, 40, and 41 and secured at its other end to the manipulating lever or hook 42, which is spring-tensioned and normally held in the position shown in Fig. 8 by a spring 43. When the apparatus is in use, the operator puts the ear-tubes 44 in his ears, and dropping a coin in the slot 36 closes the circuit of the phonograph-motor ready for operation. The hook 42 is now grasped and pulled down the full length of the slot 45, which causes the transmitter 46 of the phonograph to be raised from the record-cylinder and carried to its initial position at the forward end of the record or the extremity thereof farther to the left in Fig. 1. The transmitter 46 is now caused to travel over the record-roll by the arm 27, which engages the main or screw shaft of the phonograph through the medium of the twin nuts 47, the arm 27 and the transmitter 46 traveling in synchronism or harmony with each other. So far the operation is the same as in any of the well-known phonographs, and to this construction my invention, as above described, is applied, and it can be readily seen that a series of pictures made to illustrate a phonograph-record and placed in their proper sequence upon the reel or carrier may be brought into focus with the stereoscope 48, so as to operate in perfect harmony with the record transmitted. Preparatory to the use of the picture-exhibitor and phonograph pictures are prepared to properly illustrate the song or other composition to be repeated or reproduced from the phonograph-record. This set of pictures is then mounted on the reel or endless carrier, the individual pictures being placed in the frames 12, as heretofore described, or otherwise suitably mounted on the reel or carrier in proper order to correspond with the incidents successively described in the composition. The pins 26 and 29 are then properly arranged with reference to closing the motor and magnet circuits at predetermined intervals in order to properly accomplish the result sought, as heretofore explained. Assuming that the parts are in the position shown in Fig. 7, it will be understood from the foregoing description that the motor-circuit will be closed as soon as the metallic brush 32, carried by the traveling arm 27, comes in contact with a pin 29. As soon as the motor-circuit is closed the picture-carrying reel begins to move and continues this movement long enough to bring the proper picture in front of the stereoscope 48. As soon as the picture has reached this position a pin 11 of one of the reel-chains engages the trip-lever 19 and forces the locking device 18 downwardly sufficiently to release the bar 17, which has heretofore been locked in the position shown in Fig. 7 by the said part 18. As soon as this occurs the recoil of the spring 17ᶜ will throw the bar 17 outwardly into the path of the pin 11, (see Fig. 6,) at the same time breaking the motor-circuit by disengaging the post 20 from the insulated contact 21. The motor then ceases to operate, and the bar 17 engages the pin 11 and checks the movement of the reel by interposing a positive stop to its further progress. The pins 26 and 29 are so arranged that the metallic brush 32 next engages the pin 26 and closes the magnet-circuit. The magnet being energized, the armature is drawn to the position shown in Fig. 7, allowing the part 18 to drop into the notch 17ª, thus holding the bar 17 in the position shown in said last-named figure. After the magnet has been deënergized by breaking the circuit, which occurs as soon as the brush 32 leaves the pin 26, next the said brush engages another pin 29, closes the motor-circuit, sets the reel in motion, removes the first picture, and brings another picture into view, as will be readily understood. This operation is successively repeated until the entire set of pictures illustrative of the repeated or transmitted record has been successively brought into view.

Having thus described my invention, what I claim is—

1. In an apparatus of the class described, the combination with a phonograph or similar instrument capable of repeating or reproducing recorded speech or sounds, of means for bringing successively into view at predetermined intervals, a series of pictures illustrative of the subject-matter of the repeated record, an electric motor connected with said picture-displaying means, a normally open circuit, a series of electrodes or contacts adjustably mounted on a stationary part of the instrument, located in the motor-circuit and arranged to close the circuit through a moving part of the phonograph, substantially as described.

2. In an apparatus of the class described, the combination with a phonograph or similar instrument, of means controlled from a traveling arm of the phonograph-carriage for successively displaying pictures or views illustrative of the repeated record.

3. In a picture-exhibitor, the combination with a phonograph or similar instrument, and a stereoscope, of means controlled from a traveling arm of the phonograph-carriage for bringing a series of pictures or views illustrative of the repeated record, successively into position to be viewed through the stereoscope at predetermined intervals, substantially as described.

4. In a picture-exhibitor, the combination with a phonograph or similar instrument capable of repeating recorded speech or sound, and a stereoscope arranged in suitable proximity to said instrument, of means controlled from a moving part of the phonograph-carriage for successively bringing a series of pictures or views, illustrative of the repeated record, into position to be viewed through the stereoscope, at predetermined intervals.

5. The combination with a phonograph or similar instrument, of a picture-carrier mounted in suitable proximity to the instrument, and means controlled from the carriage of the instrument for actuating the carrier at predetermined intervals.

6. The combination with a phonograph or similar instrument, of a picture-carrier normally locked against movement, means controlled by a moving part of the phonograph-carriage for unlocking the carrier, and means also controlled by a moving part of the phonograph for actuating the picture-carrier at predetermined intervals.

7. The combination with a phonograph or similar instrument, of a normally locked picture-carrier, means controlled from a moving part of the phonograph for unlocking the carrier, means also controlled by a moving part of the phonograph for actuating the carrier, and means controlled by the moving carrier, for locking the latter against movement when it has traveled a predetermined distance.

8. The combination with a phonograph or similar instrument, of a picture-carrier mounted to move in suitable proximity thereto, an electric motor connected to operate the carrier, a normally open motor-circuit, and means mounted on the carriage of the phonograph for closing said circuit at predetermined intervals.

9. The combination with a phonograph or a similar instrument, of a picture-carrier mounted to move in suitable proximity to the instrument, and an electric motor controlled from the phonograph-carriage, for actuating the carrier at predetermined intervals.

10. The combination with a phonograph or similar instrument, of a picture-carrier, an electric motor connected to operate said carrier, a motor-circuit controlled by a moving part of the phonograph, a carrier-locking device, an electromagnet whose armature is connected with said device, and a magnet-circuit arranged to be controlled by a moving part of the phonograph.

11. The combination with a phonograph or similar instrument, of a picture-carrier mounted in suitable proximity to said instrument, an electric motor connected to operate said carrier, a normally open motor-circuit, an electromagnet arranged when energized to close the motor-circuit, and a magnet-circuit controlled by a moving part of the phonograph.

12. The combination with a phonograph or similar instrument, of a picture-carrier arranged in suitable proximity thereto, an electric motor connected to operate the carrier, a normally open motor-circuit, and a number of electrodes or contacts adjustably mounted and located in the motor-circuit, and arranged to close the circuit through a moving part of the phonograph.

13. The combination with a phonograph or similar instrument, of a picture-carrier, an electric motor connected to operate the carrier, a normally open circuit, and a number of electrodes or contacts adjustably mounted and arranged to close the motor-circuit through a moving part of the phonograph.

14. The combination with a phonograph or similar instrument, of a picture-carrier arranged in suitable proximity to the phonograph, an electric motor connected to operate said carrier, a normally open motor-circuit, a series of electrodes or contacts adjustably mounted and lying in said circuit, and a part connected to move with a moving part of the phonograph for successively engaging said electrodes and closing the motor-circuit, substantially as described.

15. The combination with a phonograph or similar instrument, of a picture-carrier mounted in suitable proximity to the phonograph, an electric motor connected to operate said carrier, a normally open motor-circuit, an electromagnet arranged when energized to close the motor-circuit, a magnet-circuit, a part connected with a moving part of the phonograph, and a series of electrodes or contacts lying in the path of said connected part and arranged to successively close the magnet-circuit.

16. The combination with a phonograph or similar instrument, of a picture-carrier arranged in suitable proximity thereto, an electric motor connected to operate the carrier, a normally open motor-circuit, a carrier-locking device, an electromagnet for operating said device, and a normally open magnet-circuit, the two circuits being arranged to be alternately closed by a moving part of the phonograph.

17. The combination with a phonograph or similar instrument, of a picture-carrier, an electric motor connected to operate the carrier, a motor-circuit, a locking device for the carrier, an electromagnet connected to operate the carrier-locking device, a magnet-circuit, a series of electrodes or contacts located in the motor-circuit, another series of electrodes or contacts located in the magnet-circuit, and means connected with a moving part of the phonograph for alternately and successively engaging the electrodes or contacts of the two circuits whereby the circuits are closed, substantially as described.

18. The combination with a phonograph or similar instrument, of a picture-carrier mounted in suitable proximity to the said instrument, an electric motor connected to operate the carrier, a normally open motor-circuit, a metal strip insulated from the phonograph and lying in the motor-circuit, a series of electrodes or contacts adjustably connected with said strip, and a metal brush connected with a moving part of the phonograph and adapted to successively engage said electrodes or contacts, whereby the circuit is closed at predetermined intervals, substantially as described.

19. The combination with a phonograph or similar instrument, of a picture-carrier, an electric motor connected to operate said carrier, a normally open motor-circuit, a carrier-locking device, an electromagnet for operating said device, a normally open magnet-circuit, two metal strips insulated from the phonograph, a series of electrodes or contacts adjustably connected with each strip, and a part connected with a moving part of the phonograph and adapted to engage both series of contacts or electrodes, whereby the circuits are closed through the moving part of the phonograph, substantially as described.

20. The combination with a phonograph or similar instrument, of an endless carrier mounted in suitable proximity to the instrument, picture-holding frames mounted thereon, an electric motor geared to the carrier in operative relation, and a normally open motor-circuit, arranged to be closed through a moving part of the phonograph-carriage at predetermined intervals.

21. The combination with a phonogragh or similar instrument, and a stereoscope, of an endless carrier, mounted in suitable proximity to the phonograph, and in front of the stereoscope at the proper focal distance, an electric motor connected to operate the carrier, and a normally open motor-circuit arranged to be controlled by a moving part of the phonograph-carriage, substantially as described.

22. The combination with a phonograph or similar instrument, of a carrier composed of two endless chains, sprocket-wheels which the chains engage, and a series of picture-holding frames connected with the chains and spanning the space between the same, an electric motor geared to one of the sprocket-axles to operate the carrier, and a normally open motor-circuit arranged to be closed at predetermined intervals by a moving part of the phonograph-carriage.

23. The combination with a phonograph or similar instrument, of a carrier mounted in suitable proximity thereto and composed of endless chains mounted on sprocket-wheels, an electric motor connected to operate the carrier, a normally open motor-circuit, an electromagnet, a carrier-locking device, comprising a bar, spring-held to project into the path of a part of the carrier whereby the latter is held against movement, the said bar being connected with an armature of the magnet and arranged to be withdrawn out of the path of the moving part of the carrier when the magnet is energized, a device for locking the bar in the withdrawn position, and a trip-lever connected with said device and projecting into the path of the carrier, whereby a part of the carrier engages the trip-lever and releases the spring-held locking-bar at predetermined intervals, substantially as described.

24. The combination with a phonograph or similar instrument, of a picture-carrier, and a motor connected to operate the carrier, said motor being independent of the motor or operating mechanism of the instrument, and controlled from the phonograph-carriage.

25. In an apparatus of the class described, the combination with a phonograph or similar instrument, of a picture-carrier, an electric motor connected to operate the carrier, said motor being independent of the motor or operating mechanism of the instrument, a motor-circuit, and a number of electrodes mounted on a stationary part of the instrument, located in the motor-circuit, and arranged to close the circuit through an arm of the carriage of the instrument.

26. The combination with a phonograph or similar instrument, of a picture-carrier, an electric motor connected to operate the carrier, said motor being independent of the motor or operating mechanism of the instrument, a series of separated electrodes or contacts mounted on a stationary part of the instrument, and a part traveling with the carriage of the instrument and arranged to successively engage the said electrodes, whereby the motor-circuit is closed at predetermined intervals, substantially as described.

In testimony whereof I affix my signature in presence of two witnesses.

THOMAS F. BURGESS.

Witnesses:
 DENA NELSON,
 A. J. O'BRIEN.